United States Patent
Tsai et al.

(10) Patent No.: US 10,737,341 B2
(45) Date of Patent: Aug. 11, 2020

(54) ELECTROCHEMICAL MACHINING APPARATUS

(71) Applicant: INTAI TECHNOLOGY CORP., Taichung (TW)

(72) Inventors: Yung-Fang Tsai, Taichung (TW); Chia-Wei Cheng, Chiayi County (TW)

(73) Assignee: INTAI TECHNOLOGY CORP., Taichung (TW)

( * ) Notice: Subject to any disclaimer, the term of this patent is extended or adjusted under 35 U.S.C. 154(b) by 154 days.

(21) Appl. No.: 15/834,080

(22) Filed: Dec. 7, 2017

(65) Prior Publication Data

US 2019/0126372 A1    May 2, 2019

(30) Foreign Application Priority Data

Oct. 31, 2017    (CN) .......................... 2017 1 1054230

(51) Int. Cl.
| | |
|---|---|
| *B23H 7/26* | (2006.01) |
| *B23H 7/22* | (2006.01) |
| *B23H 11/00* | (2006.01) |
| *B23H 9/10* | (2006.01) |
| *B23H 3/00* | (2006.01) |

(52) U.S. Cl.
CPC .................. *B23H 7/26* (2013.01); *B23H 7/22* (2013.01); *B23H 11/00* (2013.01); *B23H 3/00* (2013.01); *B23H 7/265* (2013.01); *B23H 9/10* (2013.01)

(58) Field of Classification Search
CPC . B23H 7/26; B23H 7/22; B23H 7/265; B23H 11/00; B23H 3/00; B23H 9/10
See application file for complete search history.

(56) References Cited

U.S. PATENT DOCUMENTS

| | | | | | |
|---|---|---|---|---|---|
| 3,582,525 | A | * | 6/1971 | Hahn | ....................... B23H 3/00 204/224 M |
| 3,637,481 | A | * | 1/1972 | Williams | ................. B23H 3/00 204/224 M |
| 4,797,189 | A | * | 1/1989 | Hinman | .................... B23H 3/00 204/224 M |

FOREIGN PATENT DOCUMENTS

| | | |
|---|---|---|
| CN | 102658404 A | 9/2012 |
| JP | 2003136344 A | 5/2003 |
| TW | 474843 B | 2/2002 |
| TW | 521016 B | 2/2003 |

\* cited by examiner

*Primary Examiner* — Louis J Rufo
(74) *Attorney, Agent, or Firm* — CKC & Partners Co., LLC

(57) ABSTRACT

The present disclosure provides an electrochemical machining apparatus including a pressurized tank, a cap, a stabilizing plate, a guiding element, and an electrode. The pressurizing tank has a top surface and a chamber, wherein the top surface is disposed with an opening and a limiting portion. The cap fits in the opening and is limited by the limiting portion to seal the pressurized tank. The stabilizing plate is spaced from the top surface or the cap by a distance. The guiding element penetrates the stabilizing plate to connect with the cap and provides a channel to the chamber. The electrode is guided by the guiding element and penetrates the chamber via the channel. When the electrode processes a workpiece in the chamber during an electrochemical machining operation, the cap takes a pressure generated during the electrochemical machining operation, and the stabilizing plate stabilizes the electrode and the guiding element.

14 Claims, 4 Drawing Sheets

ELECTROCHEMICAL MACHINING APPARATUS

RELATED APPLICATIONS

This application claims priority to China Application Serial Number 201711054230.6, filed Oct. 31, 2017, which is herein incorporated by reference.

BACKGROUND

Technical Field

The present disclosure relates to an electrochemical machining apparatus. More particularly, the present disclosure relates to an electrochemical machining apparatus that can stabilize the electrode during an electrochemical machining process with a stabilizing plate.

Description of Related Art

Recently, demands on high precision and large area machining technology have raised rapidly. For example, the electronic industry, the optical engineering, the biotechnology, the aeronautic industry, and the automotive industry are all equipped with high precision components.

Conventional mechanical machining tools such as lathe or milling machine are used to remove unnecessary parts of an object to form desired shapes by physical methods. However, the limitations on the operation mechanism and the structure make it difficult to produce sharp edges and complicated curvatures. Furthermore, the high temperature induced from the friction may damage the object. Moreover, it is also impossible to produce shapes in micron or nano scale, thus it cannot satisfy the needs of high precision industry.

Electrochemical Machining (ECM) is a technology that can perform the high precision and a large machining area. FIG. 1 is a schematic view showing a conventional electrochemical machining process. In FIG. 1, the electrode 102 is brought to move toward a workpiece 101 without contacting with the workpiece 101. At this time, the electrode 102 acts as a cathode, and the workpiece 101 acts as an anode. Electrolyte 103 is filled between the workpiece 101 and the electrode 102. When a current is applied to the electrode 102, the current flows from the electrode 102 to the workpiece through the electrolyte 103. Owing to the electrochemical effect, a chemical reaction occurs on the workpiece 101, and the electron and the ion are released from the workpiece 101, thus the material of the workpiece 101 is gradually removed. The electrode 102 can be moved along a predetermined path, and the electrochemical effect continuously occurs on the surface of the workpiece 101 to continuously remove the material of the workpiece 101. As a result, a desired shape can be formed on the workpiece 101.

The advantages of the aforementioned electrochemical machining are: (a) suitable for hard material because it can be performed to the materials with any hardness as long as the workpiece 101 is an electrically conductive material; (b) since the electrode 102 does not contact with the workpiece 101, the electrode 102 can be made of any material that is easy to be machined; (c) low heat is produced during the whole machining process, thus no residual stress will be left on the surface of the workpiece 101, and the characteristic of the workpiece 101 will not be influenced; and (d) suitable for processing the workpiece 101 having complicated shape and surface profile.

Despite of the aforementioned advantages of the electrochemical machining, the quality of the workpiece 101 may still be deteriorated if the electrode 102 cannot be stabilized during the machining process executed in environments with high pressure.

For example, in a conventional way, a workpiece to be processed will be placed into a pressurized tank and machined by an electrode penetrating the pressurized tank. Since the environment inside of the pressurized tank may be highly-pressurized, the housing or the upper cap of the pressurized tank may be deformed by the inner pressure of the pressurized tank. Under this situation, if the electrode is not stabilized by some specific structures, the position of the electrode may be shifted along with the deformations of the housing or the upper cap of the pressurized tank, such that the process of the electrode machining the workpiece may be negatively affected.

Therefore, it is important to design a mechanism for stabilizing the electrode during the electrochemical machining process.

SUMMARY

The present disclosure provides an electrochemical machining apparatus. The electrochemical machining apparatus includes a pressurized tank, a cap, a stabilizing plate, a guiding element, and an electrode. The pressurized tank has a top surface and a chamber, wherein the top surface is disposed with an opening and a limiting portion. The cap fits the opening and limited by the limiting portion to seal the pressurized tank. The stabilizing plate is spaced from the top surface or the cap by a predetermined distance. The guiding element penetrates the stabilizing plate to connect with the cap and providing a channel to the chamber. The electrode has a first end and a second end, wherein the first end is guided by the guiding element to penetrate the chamber via the channel. When the electrode is used to process a workpiece in the chamber during an electrochemical machining process, the cap receives a pressure generated by the electrochemical machining process, and the stabilizing plate stabilizes the electrode and the guiding element during the electrochemical machining process.

The present disclosure provides an electrochemical machining apparatus. The electrochemical machining apparatus includes a pressurized tank, a cap, a stabilizing plate, a plurality of guiding elements, and a plurality of electrodes. The pressurized tank has a top surface and a chamber, wherein the top surface is disposed with an opening and a plurality of limiting portions. The cap fits the opening and limited by the limiting portions to seal the pressurized tank. The stabilizing plate is spaced from the top surface or the cap by a predetermined distance. Each of the guiding elements penetrates the stabilizing plate to connect with the cap and provides a channel to the chamber. Each of the electrodes has a first end and a second end, and the first end of each of the electrodes is guided by one of the guiding elements to penetrate the chamber via the channel of the one of the guiding elements. When the electrodes are used to process a workpiece in the chamber during an electrochemical machining process, the cap receives a pressure generated by the electrochemical machining process, and the stabilizing plate stabilizes the electrodes and the guiding elements during the electrochemical machining process.

BRIEF DESCRIPTION OF THE DRAWINGS

The present disclosure can be more fully understood by reading the following detailed description of the embodiment, with reference made to the accompanying drawings as follows.

DETAILED DESCRIPTION

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

Figure 1:
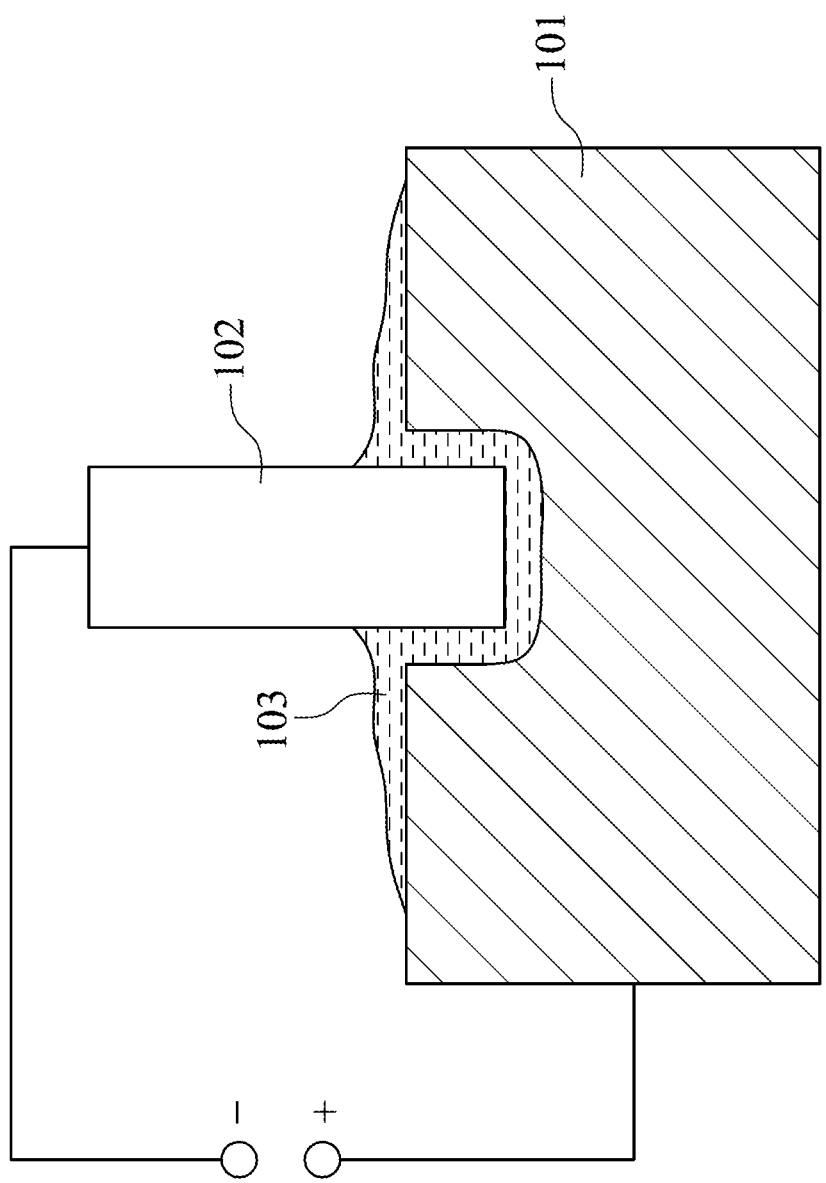
FIG. 1 is a schematic view showing a conventional electrochemical machining process.
Figure 2:
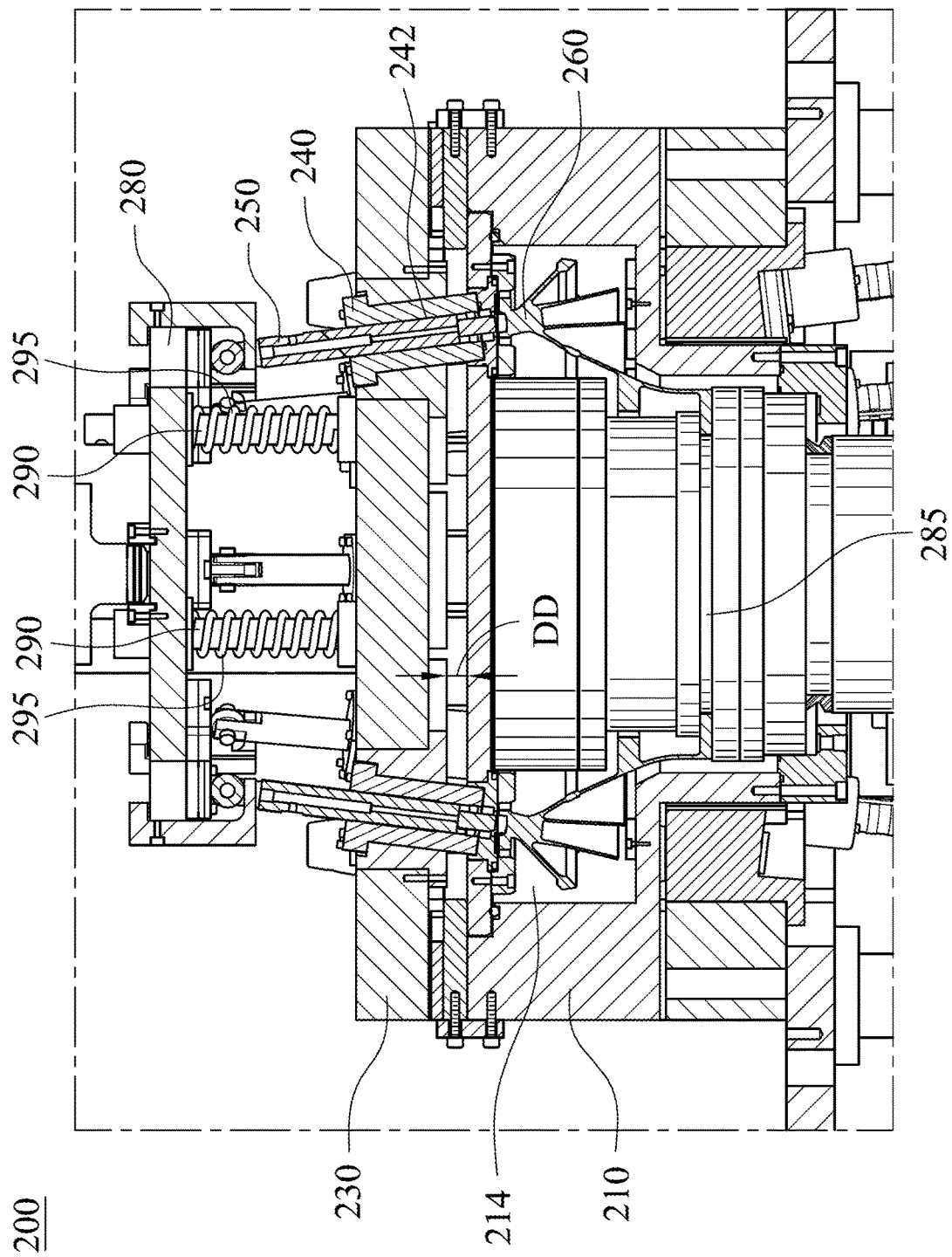
FIG. 2 is a cross-sectional view of an electrochemical machining apparatus of one exemplary embodiment of the present disclosure.
Figure 3:
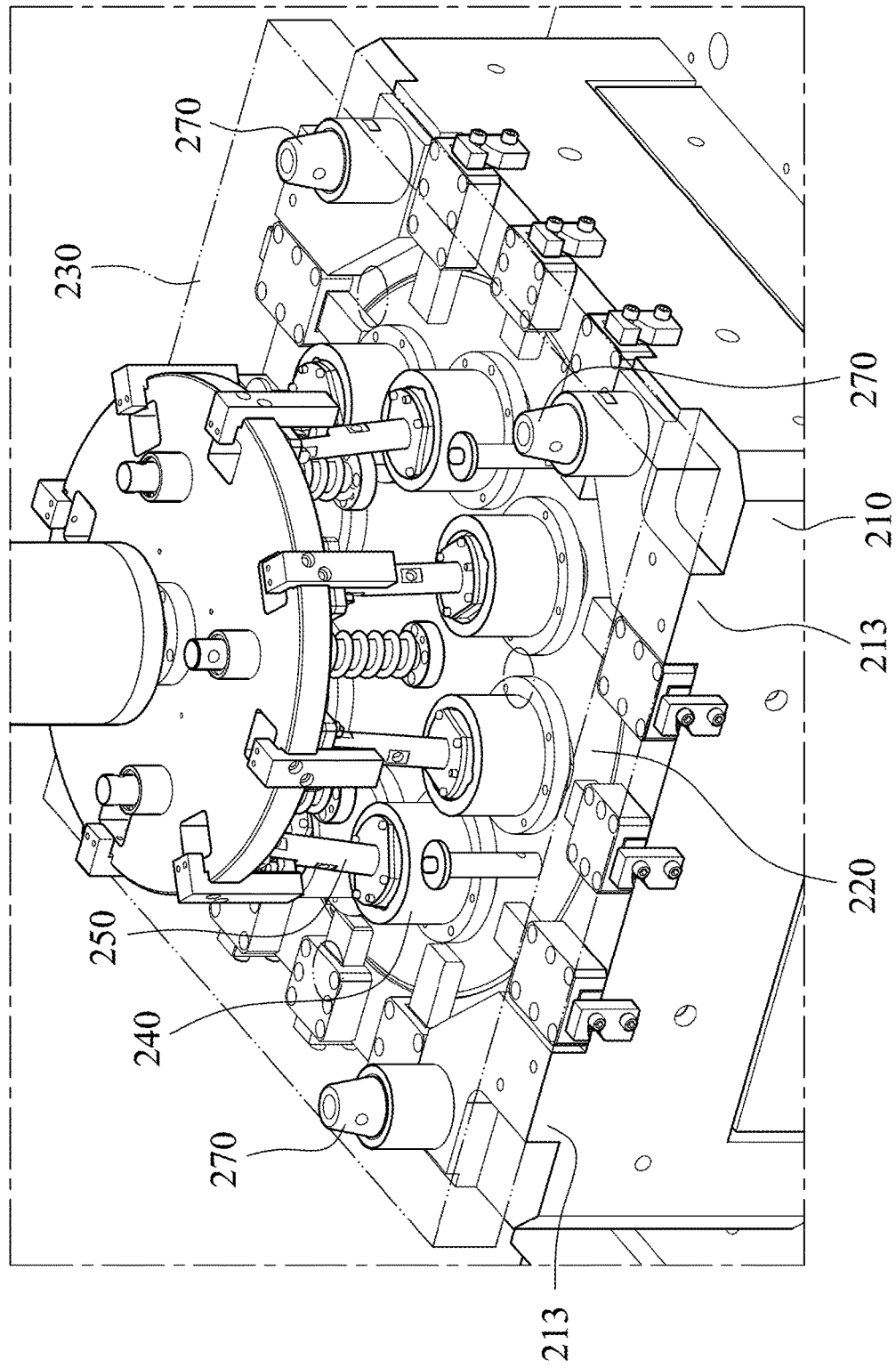
FIG. 3 is a partially perspective view of the electrochemical machining apparatus.
Figure 4:
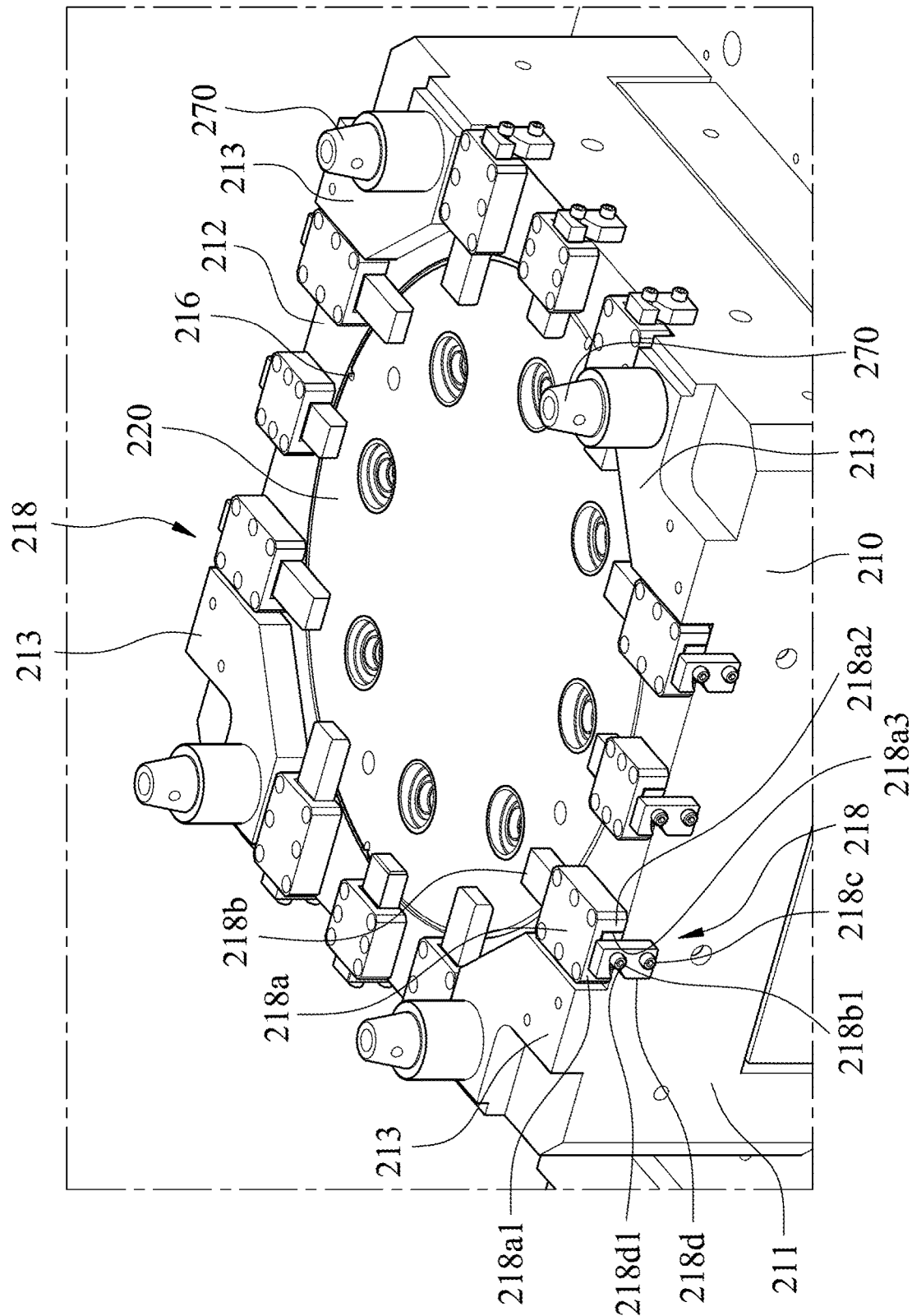
FIG. 4 is a partial view of the electrochemical machining apparatus.

See FIG. 2, FIG. 3, and FIG. 4, wherein FIG. 2 is a cross-sectional view of an electrochemical machining apparatus 200 of one exemplary embodiment of the present disclosure, FIG. 3 is a partially perspective view of the electrochemical machining apparatus 200, and FIG. 4 is a partial view of the electrochemical machining apparatus 200. As shown in FIG. 2, FIG. 3, and FIG. 4, the electrochemical machining apparatus 200 includes a pressurized tank 210, a cap 220, a stabilizing plate 230, a plurality of guiding elements 240, and a plurality of electrodes 250. The pressurized tank 210 has a top surface 212 and a chamber 214, wherein the top surface 212 is disposed with an opening 216 and a plurality of limiting portions 218. In one embodiment, the chamber 214 can be filled with electrolyte (not shown) flowing between a workpiece 260 and the electrodes 250 to make the electrochemical effects happen between the workpiece 260 and the electrodes 250.

The cap 220 fits the opening 216 and limited by the limiting portions 218 to seal the pressurized tank 210. In the present embodiment, the cap 220 may be deformed when receiving the inner pressure from the inside of the chamber 214, and the limiting portions 218 may prevent the cap 220 from being popped up by the inner pressure. The inner pressure may be the hydraulic pressure generated by the electrolyte during the electrochemical machining process, but the present disclosure is not limited thereto.

Details of the limiting portions 218 may be referred to FIG. 4, wherein FIG. 4 does not show the elements such as the stabilizing plate 230, the guiding elements 240, and the electrodes 250 to make to the structures of the pressurized tank 210 clearer, but the present disclosure is not limited thereto. In FIG. 4, each of the limiting portions 218 may include a fixed block 218a and a latch 218b. The fixed block 218a may be U-shaped and have two ends 218a1, 218a2, and a central recess 218a3, wherein the two ends 218a1, 218a2 of the fixed block 218a are fixed on the top surface 212 of the pressurized tank 210, and an axial direction of the central recess 220 points to the cap 220.

The latch 218b movably penetrates the central recess 218a3, wherein when the latch 218b is moved toward the cap 220 to a first position as shown in FIG. 4, one end of the latch 218b presses the cap 220 to limit the cap 220 in the opening 216. When the latch 218b is moved away from the cap 220 to a second position, the latch 218b has no contact with the cap 220 to release the cap 220.

In the present embodiment, another end of the latch 218b may be disposed with a protrusion 218b1, and the electrochemical machining apparatus 200 may further include a plurality of positioning posts 218c and a plurality of rotating blocks 218d. Each of the positioning posts 218c is disposed on a side wall 211 of the pressurized tank 210 and corresponding to the fixed block 218a of each of the limiting portions 218. One end of each of the rotating blocks 218d is rotatably disposed on one of the positioning posts 218c, and another end of each of the rotating blocks 218d is disposed with a tilted recess 218d1. When the latch 218b of one of the limiting portions 218 locates at the first position, the corresponding rotating block 218d rotates to limit the protrusion 218b1 of the latch 218b in the tilted recess 218d1 to fix the latch 218b at the first position, as shown in FIG. 4.

On the other hand, when the user wants to remove the cap 220 from the opening 216, the rotating block 218d can be rotated to release the protrusion 218b1 of the latch 218b from the tilted recess 218d1. Next, the latch 218b may be pulled away from the cap 220, such that the latch 218b may have no contact with the cap 220 to release the cap 220, but the present disclosure is not limited thereto.

As shown in FIG. 4, a plurality of bumps 213 may be disposed on the top surface 212 of the pressurized tank 210, and each of the bumps 213 extends toward a normal direction of the top surface 212. A height of each of the bumps 213 is higher than a height of the fixed block 218a, wherein the bumps 213 may collectively provide a bearing surface spaced from the top surface 212 of the pressurized tank 210 by a predetermined distance DD. In this case, the stabilizing plate 230 may be placed on the bearing surface, such that the stabilizing plate 230 may be spaced from the top surface 212 of the pressurized tank 210 by the predetermined distance DD.

Noted that although the cap 220 and the top surface 212 are aligned with each other in FIG. 4, the cap 220 may be modified to be slightly higher or lower than the top surface 212 in other embodiments. In these cases, the stabilizing plate 230 may be modified to be spaced from the cap 220 by the predetermined distance DD, but the present disclosure is not limited thereto.

Moreover, for fixing the stabilizing plate 230 on the bearing surface more stably, the electrochemical machining apparatus 200 may further include a plurality of connecting posts 270. Each of the connecting posts 270 may sequentially penetrate the stabilizing plate 230, one of the bumps 213, and the pressurized tank 210 to fix the stabilizing plate 230 on the bearing surface stably.

In various embodiments, the designer may adjust the heights of the bumps 213 to correspondingly adjust the predetermined distance DD to be large enough, such that the cap 220 may be prevented from contacting with the stabilizing plate 230 while being deformed by the inner pressure. From another point of view, after the predetermined distance DD is fixed, the inner pressure may be manipulated to make the height that the cap 220 deforms toward the stabilizing plate 230 smaller than the predetermined distance DD during the electrochemical machining process, but the present disclosure is not limited thereto.

As shown in FIG. 2 and FIG. 3, each of the guiding elements 240 penetrates the stabilizing plate 230 to connect with the cap 220 and provides a channel 242 to the chamber 214. Each of the electrodes 250 has a first end and a second end, wherein the first end of each of the electrodes 250 is guided by one of the guiding elements 240 to penetrate the chamber 214 via the corresponding channel 242.

When the electrodes 250 are used to process the workpiece 260 in the chamber 214 during an electrochemical machining process, the cap 220 receives a pressure (e.g., the aforementioned inner pressure) generated during the electrochemical machining process, and the stabilizing plate 230 stabilizes the electrodes 250 and the guiding elements 240 during the electrochemical machining process. As mentioned before, the cap 220 may be deformed by the inner pressure, and under the situation that the stabilizing plate 230 is spaced from the top surface 212 by the predetermined distance DD, the deformation of the cap 220 will not affect the electrodes 250 and the guiding elements 240 due to touching the stabilizing plate 230. Accordingly, the electrodes 250 and the guiding elements 240 may properly process the workpiece 260 without affecting the quality of the workpiece 260.

As shown in FIG. 2, the electrochemical machining apparatus 200 may further include an actuator 280, wherein the second end of each of the electrodes 250 is pivotally connected with the actuator 280, and a displacement of each of the electrodes 250 is controlled by the actuator 280. Taking FIG. 2 as an example, the actuator 280 may move downward to correspondingly push the electrodes 250 into the pressurized tank 210 to perform the electrochemical process operation to the workpiece 260 based on requirements. That is, the electrodes 250 may be electrified and gradually approaching the workpiece 260 without contacting with the workpiece 260, such that the surface of the workpiece 260 is chemically changed to produce a substance such as a metal-hydroxide. As a result, the materials on the surface of the workpiece 260 will be gradually removed to shape the workpiece 260 as required. The moving paths of the electrodes 250 may be different based on the ways they are pivotally connected to the actuator 280 to achieve more complicated machining effects. Moreover, when the position and/or the angle of the workpiece 260 needs to be adjusted, the actuator 280 may move upward to correspondingly withdraw the electrodes 250 from the pressurized tank 210.

The electrochemical machining apparatus 200 may further include a plurality of guiding posts 290 and a plurality of elastic members 295. The guiding posts 290 are erected on the stabilizing plate 230 and penetrating the actuator 280. Each of the elastic members 295 sleeves one of the guiding posts 290 and is disposed between the stabilizing plate 230 and the actuator 280, wherein the elastic members 295 are used to provide the actuator 280 with an elastic recovering force. Accordingly, the electrodes 250 may be withdrawn from the pressurized tank 210 by the actuator 280 more easily. On the other hand, the elastic members 295 may smooth the operation of the actuator 280 pushing the electrodes 250 into the pressurized tank 210, such that the possibility of damaging the workpiece 260 while the electrodes 250 entering the pressurized tank 210 can be lowered.

In one embodiment, the position or the angle of the workpiece 260 in the pressurized tank 210 can be controlled by a platform 285 that supports the workpiece 260. For example, after the electrodes 250 are withdrawn from the pressurized tank 210, the platform 285 may horizontally rotate the workpiece 260 and/or vertically move the workpiece 260 to facilitate the electrodes 250 to subsequently process the required parts of the workpiece 260, but the present disclosure is not limited thereto.

To sum up, the present disclosure provides an electrochemical machining apparatus including a stabilizing plate. Since the stabilizing plate is spaced from the top surface or the cap of the pressurized tank by a predetermined distance, the stabilizing plate will not be affected by the deformation of the cap during the electrochemical machining process. That is, the deformation of the cap will not touch the stabilizing plate, and hence the position or the angle of the electrodes or the guiding elements will not be affected by the deformation of the cap. Accordingly, the electrodes may function normally to process the workpiece to guarantee the quality of the workpiece.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrochemical machining apparatus, comprising:
   a pressurized tank having a top surface and a chamber, wherein an opening and a limiting portion are provided on the top surface, and the opening is communicated with the chamber;
   a cap fitting the opening and limited by the limiting portion to seal the pressurized tank;
   a stabilizing plate fixedly disposed above the top surface or the cap and spaced from the cap by a predetermined distance;
   a guiding element penetrating the stabilizing plate to connect with the cap and providing a channel to the chamber; and
   an electrode penetrating the guiding element and having a first end and a second end, wherein the first end is guided by the guiding element to penetrate the chamber via the channel.

2. The electrochemical machining apparatus of claim 1, further comprising an actuator, wherein the second end of the electrode is pivotally connected with the actuator, and a displacement of the electrode is controlled by the actuator.

3. The electrochemical machining apparatus of claim 2, further comprising:
   a guiding post erected on the stabilizing plate and penetrating the actuator; and
   an elastic member sleeving the guiding post and disposed between the stabilizing plate and the actuator, wherein the elastic member is used to provide the actuator with an elastic recovering force.

4. The electrochemical machining apparatus of claim 1, wherein the limiting portion comprises:
   a fixed block which is U-shaped and has two ends and a central recess, wherein the two ends of the fixed block are fixed on the top surface of the pressurized tank, and an axial direction of the central recess points to the cap; and a latch movably penetrating the central recess, wherein when the latch is moved toward the cap to a first position, one end of the latch presses the cap to limit the cap in the opening, and when the latch is moved away from the cap to a second position, the latch has no contact with the cap to release the cap.

5. The electrochemical machining apparatus of claim 4, wherein another end of the latch is disposed with a protrusion, and the electromechanical machining apparatus further comprising:
a positioning post disposed on a side wall of the pressurized tank and corresponding to the fixed block; and
a rotating block having one end rotatably disposed on the positioning post, and another end of the rotating block is disposed with a tilted recess, wherein when the latch locates at the first position, the rotating block rotates to limit the protrusion in the tilted recess to fix the latch at the first position.

6. The electrochemical machining apparatus of claim 4, further comprising a plurality of bumps, each of the bumps is disposed on the top surface of the pressurized tank and extends toward a normal direction of the top surface, and a height of each of the bumps is higher than a height of the fixed block, wherein the bumps provide a bearing surface spaced from the top surface of the pressurized tank by the predetermined distance to bear the stabilizing plate.

7. The electrochemical machining apparatus of claim 6, further comprising a plurality of connecting posts, wherein each of the connecting posts sequentially penetrates the stabilizing plate, one of the bumps, and the pressurized tank to fix the stabilizing plate on the bearing surface.

8. An electrochemical machining apparatus, comprising:
a pressurized tank having a top surface and a chamber, wherein an opening and a plurality of limiting portions are provided on the top surface, and the opening is communicated with the chamber;
a cap fitting the opening and limited by the limiting portions to seal the pressurized tank;
a stabilizing plate fixedly disposed above the top surface or the cap and spaced from the top surface or the cap by a predetermined distance;
a plurality of guiding elements, wherein each of the guiding elements penetrates the stabilizing plate to connect with the cap and provides a channel to the chamber; and
a plurality of electrodes, wherein each of the electrodes penetrates each of the guiding elements and has a first end and a second end, and the first end of each of the electrodes is guided by one of the guiding elements to penetrate the chamber via the channel of the one of the guiding elements.

9. The electrochemical machining apparatus of claim 8, further comprising an actuator, wherein the second end of each the electrodes is pivotally connected with the actuator, and a displacement of each of the electrodes is controlled by the actuator.

10. The electrochemical machining apparatus of claim 9, further comprising:
a plurality of guiding posts erected on the stabilizing plate and penetrating the actuator; and
a plurality of elastic members sleeving the guiding posts and disposed between the stabilizing plate and the actuator, wherein the elastic members are used to provide the actuator with an elastic recovering force.

11. The electrochemical machining apparatus of claim 8, wherein each of the limiting portions comprises:
a fixed block which is U-shaped and has two ends and a central recess, wherein the two ends of the fixed block are fixed on the top surface of the pressurized tank, and an axial direction of the central recess points to the cap; and
a latch movably penetrating the central recess, wherein when the latch is moved toward the cap to a first position, one end of the latch presses the cap to limit the cap in the opening, and when the latch is moved away from the cap to a second position, the latch has no contact with the cap to release the cap.

12. The electrochemical machining apparatus of claim 11, wherein another end of the latch is disposed with a protrusion, and the electromechanical machining apparatus further comprising:
a plurality of positioning posts, wherein each of the positioning posts is disposed on a side wall of the pressurized tank and corresponds to the fixed block of one of the limiting portions; and
a plurality of rotating blocks, wherein one end of each of the rotating blocks is rotatably disposed on one of the positioning posts, and another end of each of the rotating blocks is disposed with a tilted recess, wherein when the latch of one of the limiting portions locates at the first position, the corresponding rotating block rotates to limit the protrusion in the tilted recess to fix the latch at the first position.

13. The electrochemical machining apparatus of claim 11, further comprising a plurality of bumps, each of the bumps is disposed on the top surface of the pressurized tank and extends toward a normal direction of the top surface, and a height of each of the bumps is higher than a height of each of the fixed block, wherein the bumps provide a bearing surface spaced from the top surface of the pressurized tank by the predetermined distance to bear the stabilizing plate.

14. The electrochemical machining apparatus of claim 13, further comprising a plurality of connecting posts, wherein each of the connecting posts sequentially penetrates the stabilizing plate, one of the bumps, and the pressurized tank to fix the stabilizing plate on the bearing surface.

* * * * *